(12) United States Patent
Kurose

(10) Patent No.: US 6,422,963 B2
(45) Date of Patent: Jul. 23, 2002

(54) BELT POWER TRANSMISSION DEVICE

(75) Inventor: Yoshitaka Kurose, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 17 days.

(21) Appl. No.: 09/788,505

(22) Filed: Feb. 21, 2001

(30) Foreign Application Priority Data

Feb. 25, 2000 (JP) ........................................ 2000-049772

(51) Int. Cl.⁷ .............................. F16H 7/08; F16H 7/12; F16G 5/20
(52) U.S. Cl. ..................... 474/101; 474/135; 474/133; 474/109; 474/237; 474/260
(58) Field of Search ................. 474/101, 133, 474/135, 136, 110, 109, 138, 112, 268, 205, 267, 237, 260, 264, 261, 263

(56) References Cited

U.S. PATENT DOCUMENTS

| | | | |
|---|---|---|---|
| 4,473,362 A | * 9/1984 | Thomey et al. | 267/136 |
| 4,525,152 A | * 6/1985 | Speer et al. | 267/140.4 |
| 4,689,037 A | * 8/1987 | Bytzek | 474/135 |
| 5,011,460 A | * 4/1991 | Ouchi et al. | 474/133 |
| 5,362,280 A | * 11/1994 | Hirai et al. | 474/101 |
| 6,287,230 B1 | * 9/2001 | Okuno | 474/237 |

FOREIGN PATENT DOCUMENTS

| | | | |
|---|---|---|---|
| JP | 5-164206 | 6/1993 | |
| JP | 248692 A | * 9/2001 | |

* cited by examiner

Primary Examiner—David A. Bucci
Assistant Examiner—Marcus Charles
(74) Attorney, Agent, or Firm—Nixon Peabody LLP; Thomas W. Cole

(57) ABSTRACT

In pressing a slack-side span of a V-ribbed belt, entrained about a crank pulley variable in rotational speed, auxiliary pulleys and an idler pulley, with an auto tensioner, thereby automatically balancing tension of the belt, the damping coefficient DI of the auto tensioner is set in accordance with the modulus of longitudinal elasticity of the belt. For example, when the modulus of longitudinal elasticity of the belt is at least 9800 N/100% rib and less than 29400 N/100% rib, the damping coefficient DI of the auto tensioner is set at at least 20% and less than 100%. In this manner, even if the rate at which the auto tensioner absorbs elongation of the belt is as extremely small as 0.3 to 1.0 mm/deg, a rocking motion of the auto tensioner can be avoided thereby reducing the occurrence of a slip or a frictional sound of the belt and the occurrence of abrasion and frictional sounds of friction members, such as an insert bearing and a thrust washer, of the auto tensioner.

6 Claims, 5 Drawing Sheets

BELT POWER TRANSMISSION DEVICE

FIELD OF THE INVENTION

This invention relates to a belt power transmission device capable of automatically balancing belt tension by pressing a span of a power transmission belt, such as a V-ribbed belt, entrained about pulleys with an auto tensioner, and more particularly relates to a technique for suppressing a slip, noise and other adverse effects of the belt that are caused by a rocking motion of the auto tensioner associated with a variation in rotational speed of a drive pulley.

DESCRIPTION OF THE PRIOR ART

As belt power transmission devices for driving auxiliary machinery which are used to drive auxiliary machinery such as an alternator or a pump for power steering with an engine output, conventionally well known are devices formed by entraining a V-ribbed belt (multiple-ribbed belt) about a crank pulley on a crank shaft of an engine and auxiliary pulleys on input shafts of auxiliary machines.

Furthermore, in recent years, such belt power transmission devices often employ a serpentine drive layout for driving a belt in a manner to entrain the belt about respective pulleys not only with its inner face but also with its outer face, together with an auto tensioner (automatic belt tension balancer), integrated into the belt power transmission device, for automatically balancing belt tension by normally pressing, for example, a slack-side span of a belt. The serpentine drive provides improved maintainability, elongated life and enhanced reliability of the belt.

However, such a serpentine drive has a problem that if a variation in rotational speed of the drive pulley is large (for example, if the peak value of the rate of variation in rotational speed thereof is within the range of 10 to 30%) under particular service conditions of the layout of the auto tensioner, the setting of damping torque and the type of belt for use, then a rocking motion of the auto tensioner (more specifically, a rocking motion of the tension pulley and the arm thereof) and a tension variation of the belt become large.

To cope with the above problem, there has been proposed a technique for restricting elongation of a belt to reduce the tension variation thereof under conditions that variations in rotational speed of the drive pulley are large by setting the belt properties to increase the modulus of longitudinal elasticity (longitudinal modulus) of the belt, as disclosed in Japanese Unexamined Patent Application Gazette No. 5-164206.

While the above proposed technique characterizes the belt properties in relation with the properties of the auto tensioner, it does not clearly disclose the tension variation of the belt and rocking motions of the auto tensioner responsive to elongation of the belt due to the tension variation thereof. Therefore, when the auto tensioner has an extremely small rate of absorption of belt elongation, for example, 0.3 to 1.0 mm/deg, if a rocking motion of the auto tensioner becomes very large due to the layout of the auto tensioner relative to the belt, properties of the engine and the auxiliary machinery, the belt properties, the damping property of the auto tensioner or the like, simply specifying the modulus of longitudinal elasticity of the belt as done in the above proposed technique could not avoid the occurrence of a slip or a frictional sound of the belt and the occurrence of abrasion and a frictional sound of a resin-made friction member of the auto tensioner.

Note that the rate at which the auto tensioner absorbs belt elongation represents the amount of absorption of a length of the belt per unit angle of the arm of the auto tensioner, and is also called the take up rate.

An object of the present invention is to suppress rocking motions of the auto tensioner to reduce the occurrence of a slip and a frictional sound of the belt and the occurrence of abrasion and a frictional sound of the friction member of the auto tensioner by further suitably associating the belt properties with the auto tensioner properties when the auto tensioner has a small rate of absorption of belt elongation.

SUMMARY OF THE INVENTION

To attain the above object, the present invention is directed to a belt power transmission device in which a power transmission belt is entrained about a plurality of pulleys including a drive pulley variable in rotational speed and a driven pulley and an auto tensioner is provided for automatically balancing tension of the power transmission belt by normally pressing a span of the belt, and the power transmission belt is characterized in that when the rate at which the auto tensioner absorbs elongation of the power transmission belt is 0.3 to 1.0 mm/deg, the damping coefficient of the auto tensioner is set in accordance with the modulus of longitudinal elasticity of the power transmission belt.

With the above structure, when the rate at which the auto tensioner absorbs elongation of the power transmission belt is as extremely small as 0.3 to 1.0 mm/deg, the damping coefficient of the auto tensioner is set in accordance with the modulus of longitudinal elasticity of the power transmission belt. Therefore, even when the auto tensioner has such an extremely small rate of absorption of elongation of the power transmission belt, a rocking motion of the auto tensioner can be minimized thereby reducing the occurrence of a slip and a frictional sound of the belt and the occurrence of abrasion and a frictional sound of a friction member of the auto tensioner.

The drive pulley may be a crank pulley carried on an output shaft of an engine, the driven pulley may be an auxiliary pulley carried on an input shaft of an auxiliary machine, and the power transmission belt may be a V-ribbed belt entrained about at least the crank pulley and the auxiliary pulley in a serpentine drive layout.

With this arrangement, particularly in the belt power transmission device for driving the auxiliary machinery with the engine, a rocking motion of the auto tensioner can be suppressed thereby reducing the occurrence of a slip and a frictional sound of the belt and the occurrence of abrasion and a frictional sound of a friction member of the auto tensioner.

Furthermore, in the above case, the modulus of longitudinal elasticity of the V-ribbed belt and the damping coefficient of the auto tensioner set in accordance with the modulus may be specified. For example, it is preferable that the modulus of longitudinal elasticity of the V-ribbed belt is at least 9800N/100% rib and less than 29400 N/100% rib and the damping coefficient of the auto tensioner is at least 20% and less than 100%, or that the modulus of longitudinal elasticity of the V-ribbed belt is at least 29400 N/100% rib and less than 73500 N/100% rib and the damping coefficient of the auto tensioner is at least 10% and less than 100%, or that the modulus of longitudinal elasticity of the V-ribbed belt is at least 4900 N/100% rib and less than 9800 N/100% rib and the damping coefficient of the auto tensioner is at least 30% and less than 100%, or that the modulus of longitudinal elasticity of the V-ribbed belt is not more than 4900 N/100% rib and the damping coefficient of the auto tensioner is at least 40% and less than 100%.

DESCRIPTION OF THE PREFERRED EMBODIMENT

Figure 3:
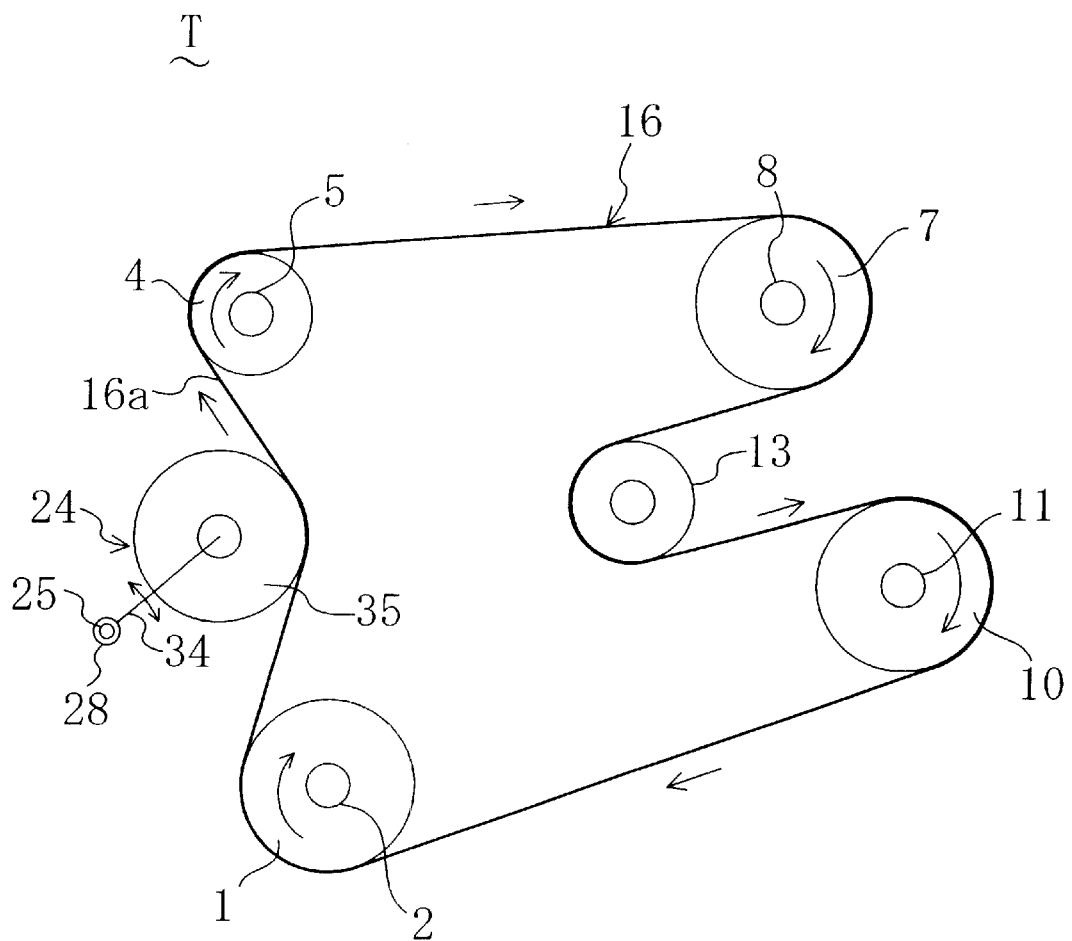
FIG. 3 is a view schematically showing the layout of pulleys of a belt power transmission device according to an embodiment of the present invention.

Hereinafter, an embodiment of the present invention will be described with reference to the drawings. FIG. 3 shows a belt power transmission device T according to an embodiment of the present invention. This belt power transmission device T is used for driving auxiliary machinery with an engine mounted on a vehicle.

More specifically, in FIG. 3, a reference numeral 1 denotes a crank pulley as a drive pulley formed of a V-ribbed pulley. The crank pulley 1 is carried on a crank shaft 2 as an output shaft of a vehicle-mounted engine (not shown) for unitary rotation, and rotates clockwise in the figure with specific variations in rotational speed of the crank shaft 2.

A reference numeral 4 denotes a power steering pulley as a driven pulley formed of a V-ribbed pulley arranged substantially vertically above the crank shaft 2. The power steering pulley 4 is carried on an input shaft 5 of a power steering pump (the entire structure of which is not shown) in the vehicle for unitary rotation.

A reference numeral 7 denotes an alternator pulley as a driven pulley formed of a V-ribbed pulley arranged in a lateral position of the power steering pulley 4 and substantially on the same level. The alternator pulley 7 is carried on an input shaft 8 of an alternator (the entire structure of which is not shown) for unitary rotation.

A reference numeral 10 denotes an air conditioner pulley as a driven pulley formed of a V-ribbed pulley arranged substantially vertically below the alternator pulley 7. The air conditioner pulley 10 is carried on an input shaft 11 of an air conditioning compressor (the entire structure of which is not shown) in the vehicle.

An idler pulley 13 formed of a flat pulley having a flange (not shown) for restricting belt meandering is disposed between the alternator pulley 7 and the air conditioner pulley 10.

Further, a V-ribbed belt 16 as a power transmission belt is entrained about the crank pulley 1 (as a drive pulley), the power steering pulley 4, the alternator pulley 7 and the air conditioner pulley 10 (which are driven pulleys and auxiliary pulleys). The V-ribbed belt 16 is entrained about the crank pulley 1, the power steering pulley 4, the alternator pulley 7 and the air conditioner pulley 10 through its inner face contact and about the idler pulley 13 through its outer face contact. In this manner, the belt of the belt power transmission device T forms a serpentine drive layout.

Figure 5:
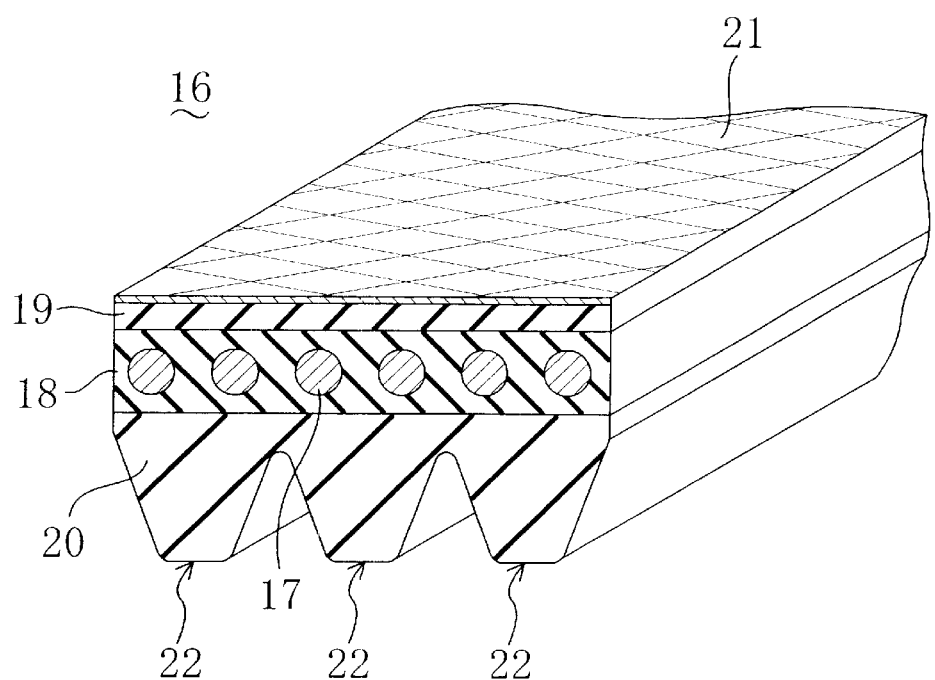
FIG. 5 is a perspective view showing the structure of a V-ribbed belt.

As shown in FIG. 5, the V-ribbed belt 16 has an adhesion rubber layer 18 in which a cord 17 made of polyester or aramid fibers is embedded. The adhesion rubber layer 18 is integrally formed with a tension rubber layer 19 located on the top side thereof (belt back face side) and a compression rubber layer 20 located on the bottom side thereof (belt inner face side). A top fabric hlayer 21 is adhered to the top face of the tension rubber layer 19, and a plurality of ribs 22, 22, . . . extending lengthwise of the belt are juxtaposed widthwise of the belt in the compression rubber layer 20.

As shown in FIG. 3 again, an auto tensioner 24 is disposed between the crank pulley 1 and the power steering pulley 4, i.e., in a slack side span 16a of the belt 16 running clockwise in FIG. 3, to automatically balance belt tension by normally pressing the slack side span 16a against the inner face of the belt 16 with a tension pulley 35.

Figure 4:
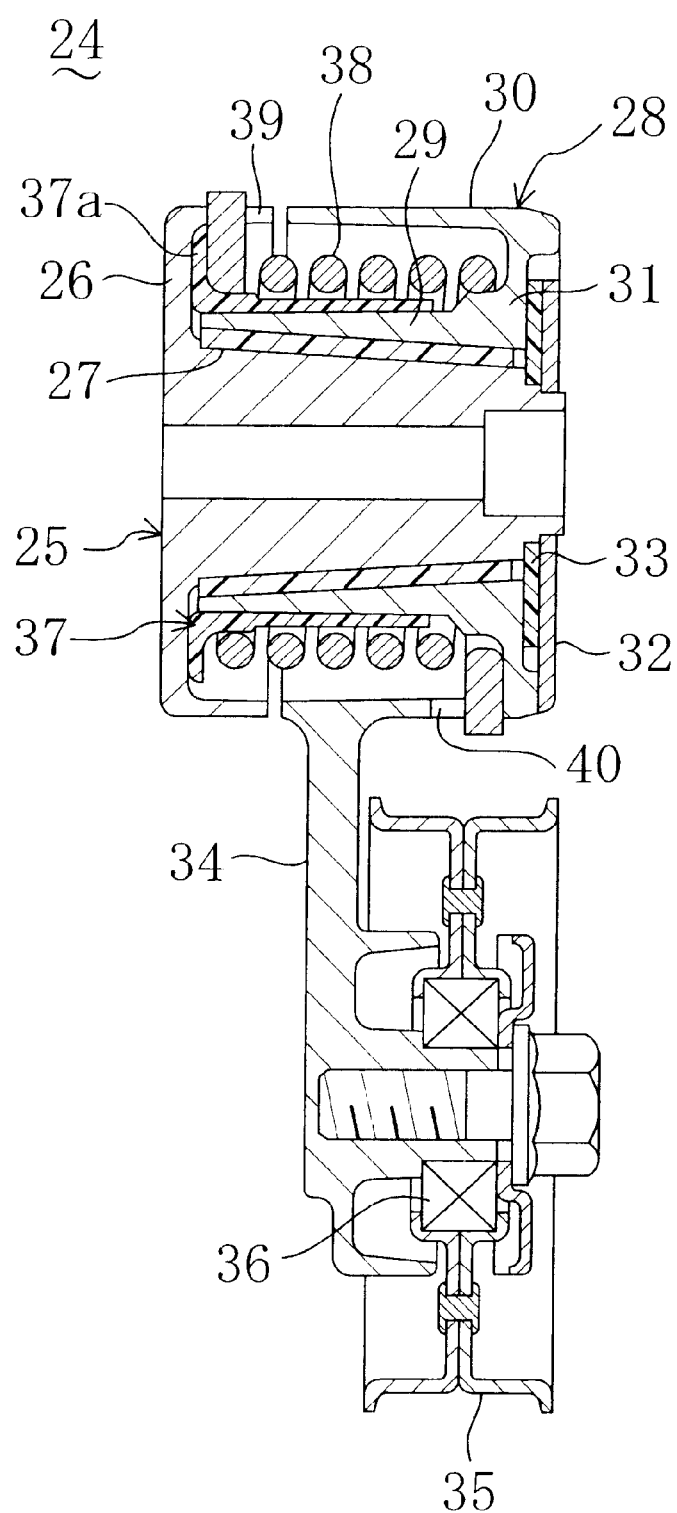
FIG. 4 is an enlarged cross-sectional view of an auto tensioner.

As shown in FIG. 4, the auto tensioner 24 includes a cylindrically tapered spindle 25 fixedly mounted on the engine against rotation, and a rear cup portion 26 is integrally formed at the proximal end of the spindle 25. A double-walled cylindrical rotating member 28 is rotatably fitted onto the spindle 25 from its distal end through an insert bearing 27 made of resin or other material having a predetermined coefficient of friction. The rotating member 28 is formed so that an inner cylinder 29 fitted onto the spindle 25 through the insert bearing 27, an outer cylinder 30 coaxially disposed outside of the inner cylinder 29 and a disk-shaped flange 31 connecting the inner and outer cylinders 29 and 30 at their proximal ends (on the distal end side of the spindle 25) are integrally formed. The rotating member 28 is connected at its flange 31 to the spindle 25 against disengagement from the spindle 25 through a disk-shaped front plate 32 caulked to the distal end of the spindle 25. A disk-shaped thrust washer 33 made of resin or other material having a predetermined coefficient of friction is interposed between the flange 31 and the front plate 32. The outer cylinder 30 of the rotating member 28 is integrally formed with an arm 34 radially outwardly extending therefrom. The tension pulley 35 formed of a flanged flat pulley having a rotation axis parallel with the spindle 25 is rotatably supported to the distal end of the arm 34 through a bearing 36. The slack-side span 16a of the V-ribbed belt 16 is entrained about the tension pulley 35 through its outer face contact.

Furthermore, a cylindrical spring support 37 is fitted onto the inner cylinder 29 of the rotating member 28. The spring support 37 has a flange 37a which is located on the proximal end side of the spindle 25 and made contact with the rear cup portion 26 of the spindle 25. A torsion coil spring 38 is disposed on the spring support 37 in a space defined by the inner and outer cylinders 29, 30 of the rotating member 28, one end thereof is anchored in an engagement part 39 formed by partly cutting away the rear cup portion 26 and the other end thereof is anchored in an engagement part 40 formed by partly cutting away the proximal end portion of the outer cylinder 30 of the rotating member 28. The torsion coil spring 38 urges the rotating member 28, the arm 34 and the tension pulley 35 into rotation in a single direction (clockwise in FIG. 3) around the spindle 25 by its torsion spring force, and the tension pulley 35 normally presses the slack side span 16a of the belt 16. Further, when the rotating member 28, the arm 34 and the tension pulley 35 rotate around the spindle 25 by a spring force of the torsion coil spring 38 and a reaction force of the belt 16, their rotation is damped at a predetermined damping coefficient DI by the insert bearing 27 and the thrust washer 33 thereby automatically balancing the belt tension.

The rate at which the auto tensioner 24 absorbs elongation of the V-ribbedbelt 16 is set at 0.3 to 0.1 mm/deg, and the damping coefficient DI of the auto tensioner 24 is set in accordance with the modulus of longitudinal elasticity of the V-ribbed belt 16.

The rate at which the auto tensioner 24 absorbs elongation of the V-ribbed belt 16 is also called "the take up rate", which is set in order to absorb changes in length of the belt 16. The factors of such changes in length of the belt 16 include abrupt increase and decrease of the engine speed, rotational speed variations or torque variations of the engine, load variations of the auxiliary machine, moment of inertia in switching between ON and OFF, dimensional changes of the engine or a mounting bracket due to thermal expansion or shrinkage, dimensional changes of the cord 17, and dimensional changes of the belt 16 due to abrasion. If the take up rate for the belt 16 is small, then the amount of travel of the arm 34 of the auto tensioner 24 for the same change in length of the belt 16 is increased and the amount of slide of the friction members (such as the insert bearing 27 and the thrust washer 33) located inside of the auto tensioner 24 is correspondingly increased.

Figure 6:
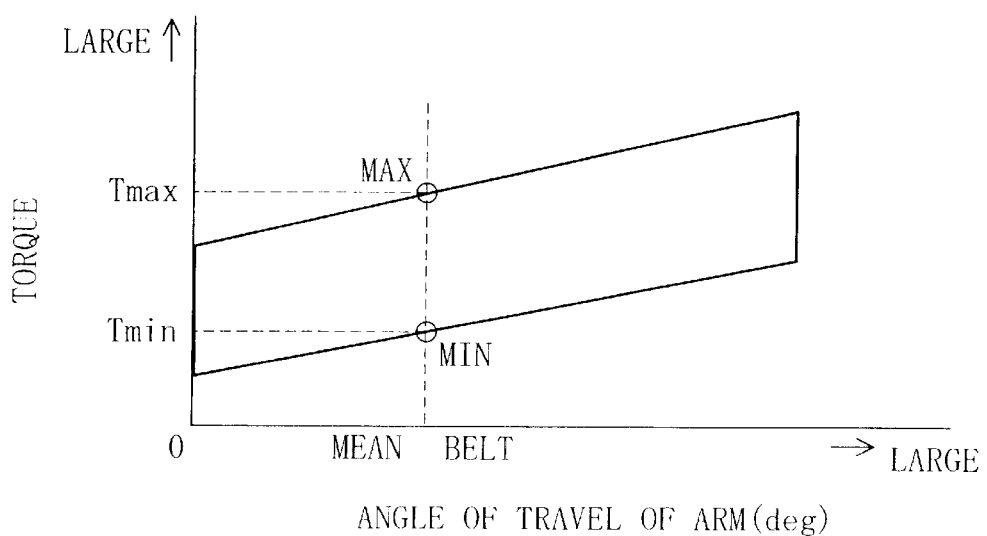
FIG. 6 is a plot for obtaining the damping coefficient of the auto tensioner.

The damping coefficient DI of the auto tensioner 24 about which the belt 16 of standard length is entrained is, when the load torque changes with hysteresis in accordance with the angle of rocking motion (travel) of the arm 34 of the auto tensioner 24 as shown in FIG. 6, determined from the maximum and minimum values Tmax and Tmin of the torque based on the following equation:

$$DI (\%) = 100 \times \{(Tmax-Tmin)/2\} \div (Tmax+Tmin)/2$$

Specifically, the damping coefficient DI of the auto tensioner 24 is set in accordance with the modulus of longitudinal elasticity of the V-ribbed belt 16, at at least 20% and less than 100% when the modulus of longitudinal elasticity of the V-ribbed belt 16 is at least 9800 N/100% rib and less than 29400 N/100% rib, or at at least 10% and less than 100% when the modulus of longitudinal elasticity of the V-ribbed belt 16 is at least 29400 N/100% rib and less than 73500 N/100% rib, or at at least 30% and less than 100% when the modulus of longitudinal elasticity of the V-ribbed belt 16 is at least 4900 N/100% rib and less than 9800 N/100% rib, or at at least 40% and less than 100% when the modulus of longitudinal elasticity of the V-ribbed belt 16 is not more than 4900 N/100% rib.

The following Table 1 shows desirable relationships between the damping coefficient DI of the auto tensioner 24 and the modulus of longitudinal elasticity of the V-ribbed belt 16 when the rate at which the auto tensioner 24 absorbs elongation of the V-ribbed belt 16 is 0.5 mm/deg and 1.0 mm/deg.

TABLE 1

| Belt longitudinal modulus (N/100% rib) | DI (%) Take up rate 0.5 mm/deg | DI (%) Take up rate 1.0 mm/deg |
| --- | --- | --- |
| 4900 or less | 50 ≦ DI < 100 | 40 ≦ DI < 100 |
| above 4900 and not more than 9800 | 35 ≦ DI < 100 | 30 ≦ DI < 100 |
| above 9800 and not more than 29400 | 25 ≦ DI < 100 | 20 ≦ DI < 100 |
| above 29400 and not more than 49000 | 15 ≦ DI < 100 | 10 ≦ DI < 100 |
| above 49000 and not more than 73500 | 10 ≦ DI < 100 | 10 ≦ DI < 100 |

Figure 1:
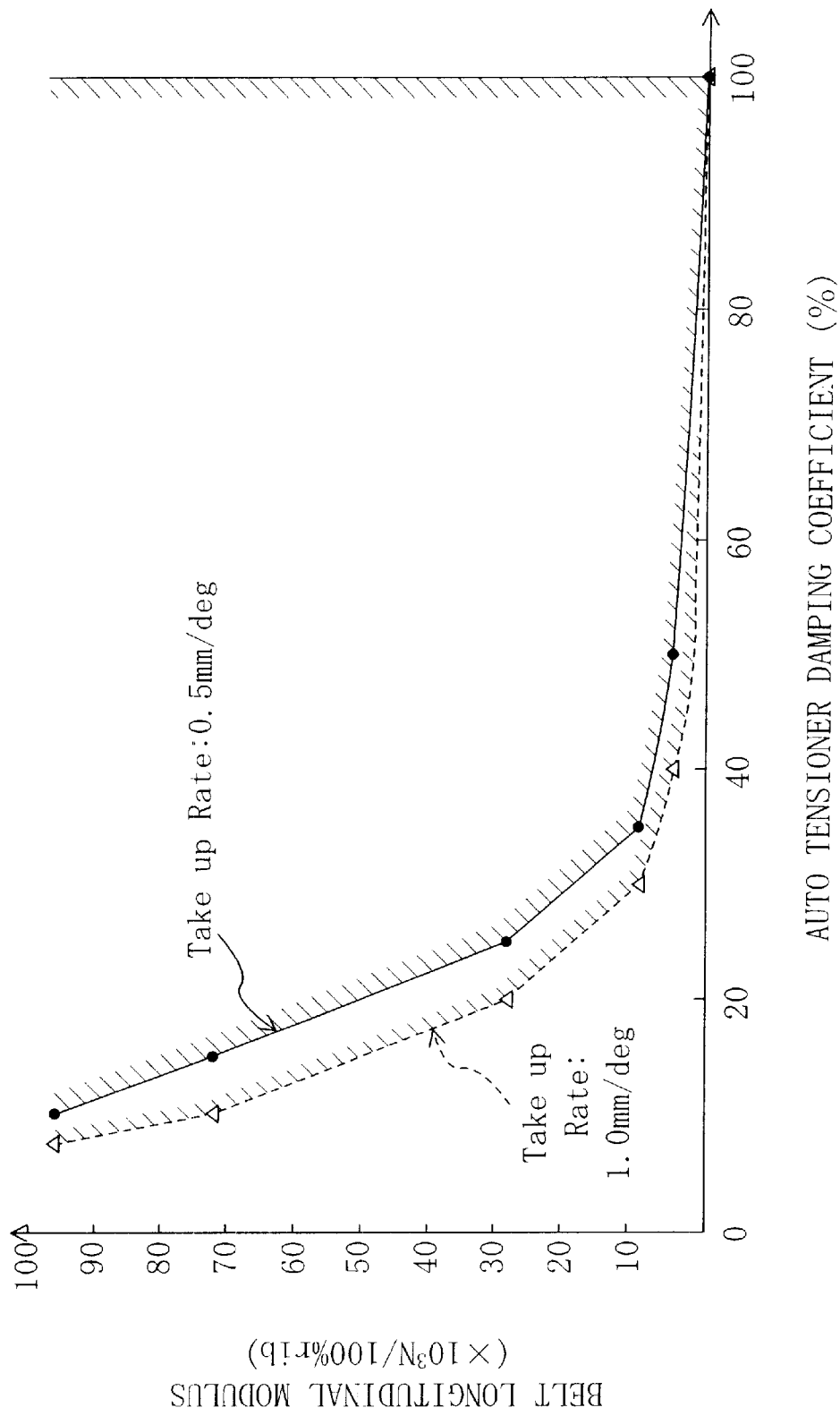
FIG. 1 is a plot showing characteristics for setting the modulus of longitudinal elasticity of the belt and the damping coefficient of the auto tensioner when the auto tensioner has a take up rate of 0.3 to 1.0 mm/deg.

FIG. 1 shows results of a test made by the Inventor for determining the range within which a slip or a frictional sound occurs, when the modulus of longitudinal elasticity of the belt 16 and the damping coefficient DI of the auto tensioner 24 are varied in an engine starting condition, in the belt 16 of the belt power transmission device T for driving auxiliary machinery with the engine as in the case of the structure of the above embodiment. In the test, a V-ribbed belt 16 having a cord 17 made of polyester or aramid fibers is used as the belt 16, and the take up rate of the auto tensioner 24 for the belt 16 is set at 0.5 mm/deg and 1.0 mm/deg. The test results shows that a slip or a frictional sound of the belt 16 does not occur within ranges surrounded by diagonal lines in FIG. 1 (which are different for the different cases where the take up rate of the auto tensioner 24 is 0.5 mm/deg and 1.0 mm/deg), and that slips and frictional sounds of the belt 16 occur within a range excluding the above ranges surrounded by the diagonal lines.

As can be seen from the above test results, when the modulus of longitudinal elasticity of the V-ribbed belt 16 is within a predetermined range, a range of the damping coefficients DI of the auto tensioner 24 is correspondingly set. If the range of the damping coefficients DI of the auto tensioner 24 is less than the lower limit value (for example, if the damping coefficient DI thereof is 35% when the take up rate of the auto tensioner 24 for the belt 16 is 0.5 mm/deg and the modulus of longitudinal elasticity of the belt 16 is 9800 N/100% rib), a rocking motion of the auto tensioner 24 becomes large thereby producing a slip or a frictional sound of the belt 16. Concurrently, a large number of slides repeatedly occur in the friction members (such as the insert bearing 27 and the thrust washer 33) of the auto tensioner 24 thereby producing abrasion or frictional sounds thereof. On the other hand, if the range of the damping coefficients DI of the auto tensioner 24 is above the upper limit value (100%), a point at which load torque of the auto tensioner 24 is zero occurs. At the point, the belt tension is also zero and therefore the belt 16 instantly produces an excessive slip.

In such a manner, the belt power transmission device T of the present invention prevents the occurrence of a slip and a frictional sound of the belt 16, the occurrence of abrasion and frictional sounds of the friction members (such as the insert bearing 27 and the thrust washer 33) of the auto tensioner 24, by setting the range of the damping coefficients DI of the auto tensioner 24 at each corresponding range as mentioned above when the modulus of longitudinal elasticity of the belt 16 is within each of the predetermined ranges.

Figure 2:
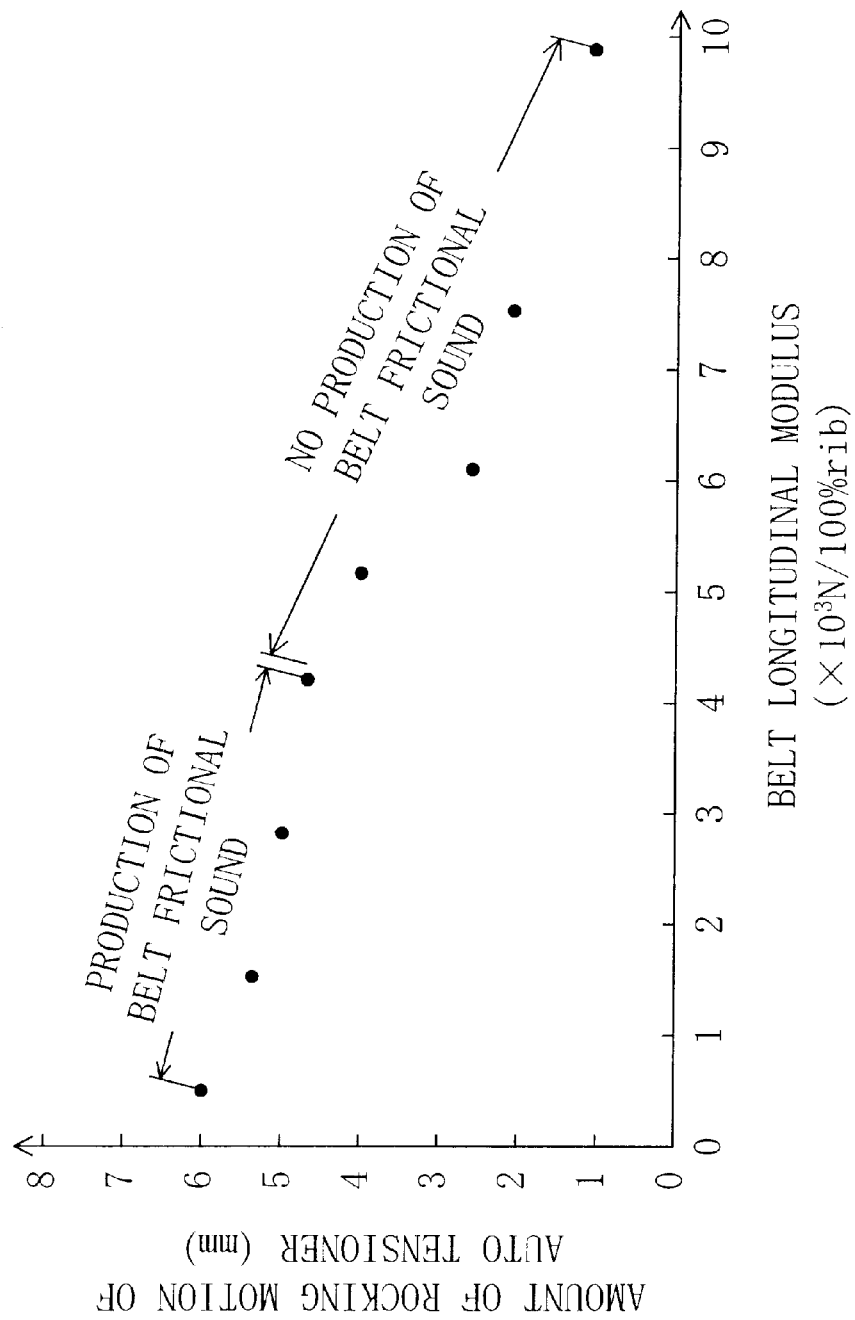
FIG. 2 is a plot showing characteristics of change in amount of rocking motion of the auto tensioner relative to change inmodulus of longitudinal elasticity of the belt.

FIG. 2 shows changes in the amount of rocking motion of the auto tensioner 24 with the modulus of longitudinal elasticity of the belt 16 during the start time of the engine for the belt power transmission device T for driving auxiliary machinery with the engine like the above case, when the take up rate of the auto tensioner 24 for the belt 16 is 0.5 mm/degand the damping coefficient DI of the auto tensioner 24 is 20%. The amount of rocking motion of the auto tensioner 24 increases with increase in the modulus of longitudinal elasticity of the belt 16. When the modulus of longitudinal elasticity of the belt 16 is approximately 42000 N/100% rib or less, the amount of rocking motion of the auto tensioner 24 becomes large thereby producing a frictional sound of the belt 16.

Accordingly, like the above embodiment, setting the damping coefficient DI of the auto tensioner 24 in accordance with the modulus of longitudinal elasticity of the V-ribbed belt 16 and changing the range of the damping coefficients DI in accordance with the range of the modulus of longitudinal elasticity of the V-ribbed belt 16 can minimize the rocking motion of the auto tensioner 24 even if the take up rate of the auto tensioner 24 for the V-ribbed belt 16 is as extremely small as 0.3 to 1.0 mm/deg, thereby reducing the occurrence of a slip or a frictional sound of the belt 16 and the occurrence of abrasion or frictional sounds of the friction members (such as the insert bearing 27 and the thrust washer 33) of the auto tensioner 24.

Note that the above embodiment is an example of belt power transmission devices T using a V-ribbed belt 16 and the present invention is applicable to various belt power transmission devices using belts of other types.

The above embodiment describes the case where auxiliary machinery of the engine is driven. However, the present invention is applicable to belt power transmission devices for synchronously driving a cam shaft of the engine or a fuel injection pump for diesel engines through a timing belt or to other belt power transmission devices.

What is claimed is:

1. A belt power transmission device in which a power transmission belt is entrained about a plurality of pulleys including a drive pulley variable in rotational speed and a driven pulley and an auto tensioner is provided for automatically balancing tension of the power transmission belt by normally pressing a span of the belt, wherein when the rate at which the auto tensioner absorbs elongation of the power transmission belt is 0.3 to 1.0 mm/deg, the damping coefficient of the auto tensioner is set in accordance with the modulus of longitudinal elasticity of the power transmission belt.

2. The belt power transmission device of claim 1, wherein the drive pulley is a crank pulley carried on an output shaft of an engine, the driven pulley is an auxiliary pulley carried on an input shaft of an auxiliary machine, and the power transmission belt is a V-ribbed belt entrained about at least the crank pulley and the auxiliary pulley in a serpentine drive layout.

3. The belt power transmission device of claim 2, wherein when the modulus of longitudinal elasticity of the V-ribbed belt is at least 9800 N/100% rib and less than 29400 N/100% rib, the damping coefficient of the auto tensioner is at least 20% and less than 100%.

4. The belt power transmission device of claim 2, wherein when the modulus of longitudinal elasticity of the V-ribbed belt is at least 29400 N/100% rib and less than 73500 N/100% rib, the damping coefficient of the auto tensioner is at least 10% and less than 100%.

5. The belt power transmission device of claim 2, wherein when the modulus of longitudinal elasticity of the V-ribbed belt is at least 4900 N/100% rib and less than 9800 N/100% rib, the damping coefficient of the auto tensioner is at least 30% and less than 100%.

6. The belt power transmission device of claim 2, wherein when the modulus of longitudinal elasticity of the V-ribbed belt is not more than 4900 N/100% rib, the damping coefficient of the auto tensioner is at least 40% and less than 100%.

* * * * *